Nov. 2, 1926.
C. F. REUTER
1,605,144
GROUSER FOR TRACTORS AND THE LIKE
Filed Feb. 28, 1925
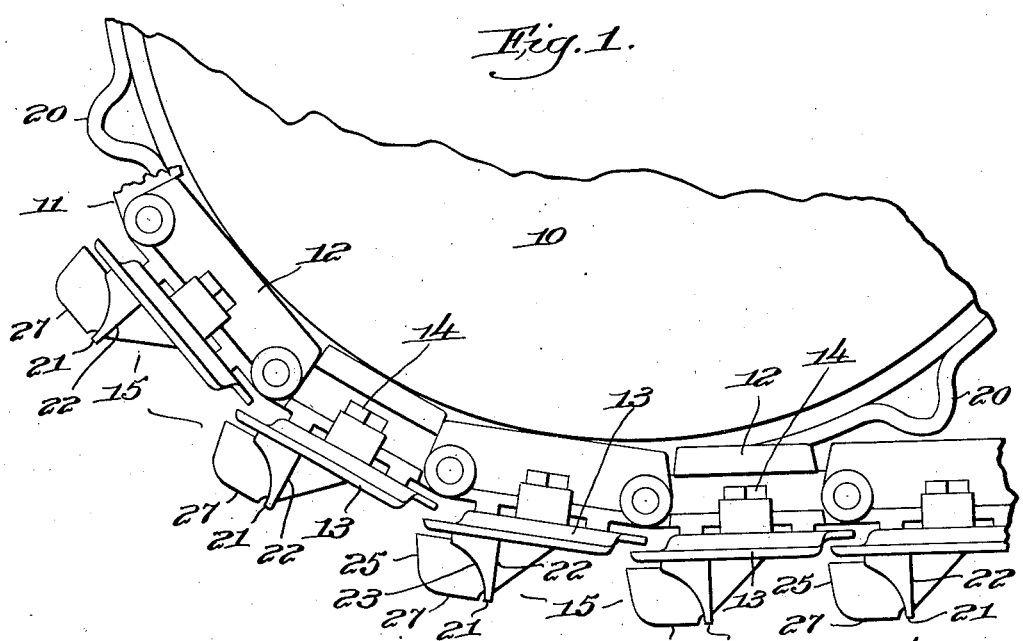
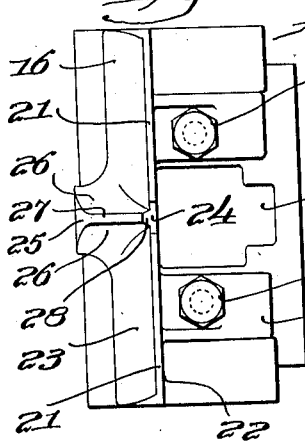
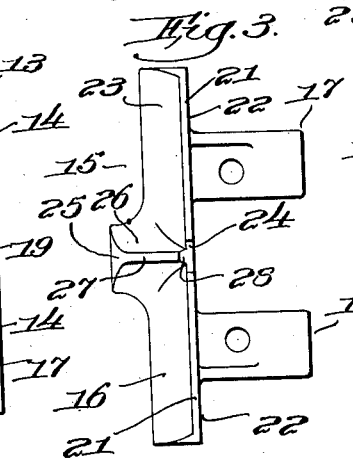
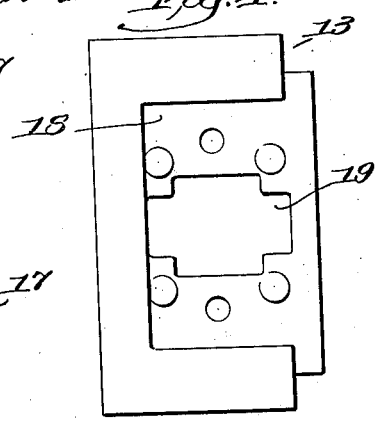
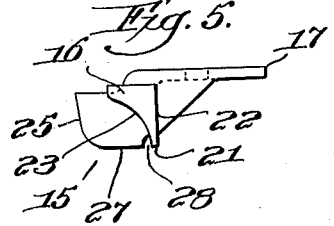
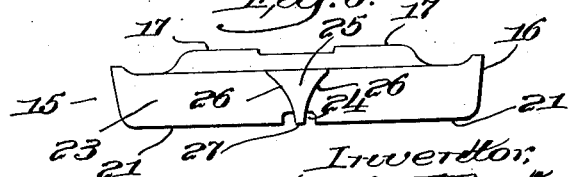

Patented Nov. 2, 1926.

1,605,144

UNITED STATES PATENT OFFICE.

CHARLES F. REUTER, OF BOSTON, MASSACHUSETTS.

GROUSER FOR TRACTORS AND THE LIKE.

Application filed February 28, 1925. Serial No. 12,241.

This invention relates to grousers or ground grippers for use in connection with tractors and the like.

It is an object of the present invention to produce a grouser for general use and which is particularly efficient when used on snow and ice, or on hillsides or slippery soil such as moist clay and the like.

It is a further object of the invention to produce a grouser affording the most efficient arrangement of gripping surface for the maximum of ground grip for the forward propulsion of a tractor, and combining therewith, means to effectually prevent lateral slippage, or side skidding thereof, whether the tractor is being used on soil or snow or ice.

Another object of the invention is to produce a grouser which may be readily applied to existing tractors, and which is equally applicable to the wheel propelled type as well as to the so-called track laying type.

A still further object of the invention is to so arrange the entering portions of the slip and skid resisting surfaces that they each enter the soil at points thereon which have not been disturbed by the other, which arrangement also enables those portions to be readily sharpened or ground when necessary, and prevents the accumulation and packing of soil or snow which would necessarily occur if sharp cornered pockets were formed by the junction of those portions.

The invention further consists in certain novel features of construction and arrangement which will be fully understood from a description of the drawings and other claims hereinafter given:

Of the drawings:

Figure 1 represents a slide elevation of a sufficient portion of one form of tractor to enable the invention to be understood.

Figure 2 is a view of the outer face of one of the shoes shown in Figure 1 with a grouser attached thereto.

Figure 3 is a view of the grouser shown in Figure 2 detached from the shoe.

Figure 4 is a view of the shoe shown in Figure 2 with the grouser removed therefrom.

Figure 5 is a side view of a grouser as seen in Figure 1 detached from its shoe.

Figure 6 is a view looking toward the right Figure 5.

Like characters represent like parts throughout the several figures of the drawings.

The drawings herewith illustrate the invention as applied to a tractor of the track laying type, but it will be understood that it might be applied to other types, and that changes might be made therein without departing from the spirit and scope of the invention, as it is not the intention to limit it to the precise construction and arrangement shown.

The sprocket wheel 10, chain 11 composed of links 12, and shoes 13 are or may be of any usual or suitable type, those parts shown herein having been taken from the well known Bear tractor as an illustration of the application of the invention to the track laying type.

In the present instance the shoes 13 are secured to the links 12 by means of the bolts 14 which also conveniently serve to secure the grousers 15 to the shoes, but it will be understood that other means might be employed so long as a substantial fastening thereof is obtained, and preferably in a readily accessible manner.

The grousers 15 are composed of bar like portions 16 having rearwardly extending portions 17 so arranged as to snugly fit into depressions 18, which exist in the type of shoes referred to and form positioning means for the grousers and aid the bolts 14 in retaining them in their positions, the said arrangement leaving a space between the portions 17 corresponding with the holes 19 of the shoes 13 for the free passage of soil or snow outwardly, when the teeth 20 of the wheel 10 engage the chain 11.

The said bar portion 16 has a ground or soil entering edge 21 formed by the generally smooth soil engaging face or wall 22, and the concave face 23, the said edge 21 having a notch 24 therein for a purpose to be described.

Forwardly extending from the bar 16 is a fin or calk like portion 25, the slides 26 of which are preferably concave and terminate in a soil or ground entering edge 27 which is cut away at 28 so that it does not form a junction with the entering edge 21, thus breaking up any sharp cornered pockets which would otherwise be formed.

The notch 24 and the cut away 28 also conveniently serve to facilitate in the grinding or sharpening operation of the edges 21 and 27, which operation is at times required, the space acquired by the notch and cut away being such as to permit the passage of a grinding or sharpening tool along both the entering edges for the proper performance of its duty and breaks up sharp cornered pockets thus preventing lodgment and packing of soil or snow.

From the foregoing it will be readily seen that the grouser is a simple one, and has its gripping surface 22 disposed to the best advantage to prevent slippage of the chain or track or running gear during the forward movement of the tractor, while the fin 25 is equally well disposed to prevent side slipping or skidding of the tractor as a whole which arrangement is of especial advantage and necessary when using the tractor on snow and ice.

While the fin 25 is shown as centrally disposed with respect to the bar 15 it will be understood that it may occupy a different position, or more than one fin may be employed and if desired may be extended from the face 22.

Having described the invention I claim:

A grouser for tractors comprising a bar like member having an outstanding wedge shaped flange extending along one edge thereof, and a wedge shaped rib arranged approximately midway of the length of said bar and outstanding therefrom and perpendicularly with respect to said flange, and spaced members forming part of said bar and extending perpendicularly therefrom and arranged to receive securing devices for said grouser.

Signed by me at Boston, Mass., this 24th day of February, 1925.

CHARLES F. REUTER.